(12) United States Patent
Farley et al.

(10) Patent No.: US 6,357,242 B1
(45) Date of Patent: Mar. 19, 2002

(54) CONTROL SYSTEM AND METHOD FOR SUPPRESSING HEAD PRESSURE SPIKES IN A VEHICLE AIR CONDITIONING SYSTEM

(75) Inventors: Dennis Lee Farley, Lockport; Mingyu Wang, Amherst; Lindsey Lee Leitzel, Lockport, all of NY (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/620,435

(22) Filed: Jul. 20, 2000

(51) Int. Cl.$^7$ ................................................. B60H 1/32
(52) U.S. Cl. ............................. 62/133; 62/217; 62/210
(58) Field of Search ........................... 62/133, 217, 208, 62/210, 228.3, 114

(56) References Cited

U.S. PATENT DOCUMENTS

| | | | | |
|---|---|---|---|---|
| 3,899,897 A | * | 8/1975 | Boerger et al. | 62/217 |
| 4,324,286 A | * | 4/1982 | Brett | 62/133 |
| 4,531,378 A | * | 7/1985 | Nishi et al. | 62/217 |
| 4,578,960 A | * | 4/1986 | Nishi et al. | 62/217 |
| 4,756,166 A | * | 7/1988 | Tomasov | 62/217 |
| 4,870,834 A | * | 10/1989 | Ogawa et al. | 62/217 |
| 5,226,472 A | * | 7/1993 | Benevelli et al. | 62/217 |
| 5,924,296 A | * | 7/1999 | Takano et al. | 62/133 |
| 6,035,652 A | * | 3/2000 | Hashimoto | 62/133 |
| 6,105,380 A | * | 8/2000 | Yokomachi et al. | 62/228.3 |
| 6,119,473 A | * | 9/2000 | Kishita et al. | 62/133 |
| 6,145,329 A | * | 11/2000 | Brandon et al. | 62/133 |
| 6,148,632 A | * | 11/2000 | Kishita et al. | 62/217 |

* cited by examiner

Primary Examiner—Sang Paik
Assistant Examiner—Fadi H. Dahbour
(74) Attorney, Agent, or Firm—Patrick M. Griffin

(57) ABSTRACT

An improved system and method for suppressing high side pressure transients in a motor vehicle air conditioning system due to engine speed transients during vehicle acceleration through the use of a throttling valve. The throttling valve may be mechanically or electrically activated, and is connected in the low pressure side of the air conditioning system to controllably restrict refrigerant flow in response to one or more parameters that detect or anticipate a high side transient pressure condition. The parameters may include the high side pressure itself, or engine parameters such as engine speed and vehicle speed. In a preferred embodiment, the throttling valve may be controlled to prevent evaporator icing in addition to suppressing high side pressure transients.

15 Claims, 5 Drawing Sheets

CONTROL SYSTEM AND METHOD FOR SUPPRESSING HEAD PRESSURE SPIKES IN A VEHICLE AIR CONDITIONING SYSTEM

TECHNICAL FIELD

This invention relates to the control of a motor vehicle air conditioning system, and more particularly to a control that reduces head pressure spikes caused by high compressor acceleration.

BACKGROUND OF THE INVENTION

In a motor vehicle air conditioning system, the refrigerant compressor is customarily driven by the vehicle engine through a mechanical advantage drive such as a belt and pulley system. As a result, engine speed transients produce similar or more severe transients in the air conditioning system. A particularly severe transient occurs during acceleration of the vehicle from standstill, as the compressor speed can rise several thousand revolutions per minute in a matter of seconds. In this case, the transient is manifested by a sharp rise, or spike, in the compressor outlet pressure, which if unchecked, can damage or otherwise degrade the operation of various components, including the compressor itself.

In a conventional system, the high side pressure spike concern is addressed by measuring the high side pressure (with a pressure switch, for example), and de-coupling the compressor from the engine when the measured pressure exceeds a predefined threshold. However, de-coupling the compressor in this manner significantly degrades air conditioning performance and raises durability issues in respect to components such as the compressor clutch. Accordingly, what is needed is an improved way of addressing the transient pressure concern that does not significantly compromise passenger comfort or degrade the system durability.

SUMMARY OF THE INVENTION

The present invention is directed to an improved system and method for suppressing high side pressure transients in a motor vehicle air conditioning system due to engine speed transients during vehicle acceleration through the use of a throttling valve. The throttling valve may be mechanically or electrically activated, and is connected in the low pressure side of the air conditioning system to controllably restrict refrigerant flow in response to one or more parameters that detect or anticipate a high side transient pressure condition. The parameters may include the high side pressure itself, or engine parameters such as engine speed and vehicle speed. In a preferred embodiment, the throttling valve may be controlled to prevent evaporator icing in addition to suppressing high side pressure transients.

BRIEF DESCRIPTION OF THE DRAWINGS

FIG. 2A depicts a control according to a first embodiment of this invention, FIG. 2B depicts a control according to a second embodiment, and FIG. 2C depicts a control according to a third embodiment.

FIG. 3A depicts a valve design used in connection with the controls of FIGS. 2A and 2B, while FIG. 3B depicts a valve design used in connection with the control of FIG. 2C.

DESCRIPTION OF THE PREFERRED EMBODIMENT

Figure 1:
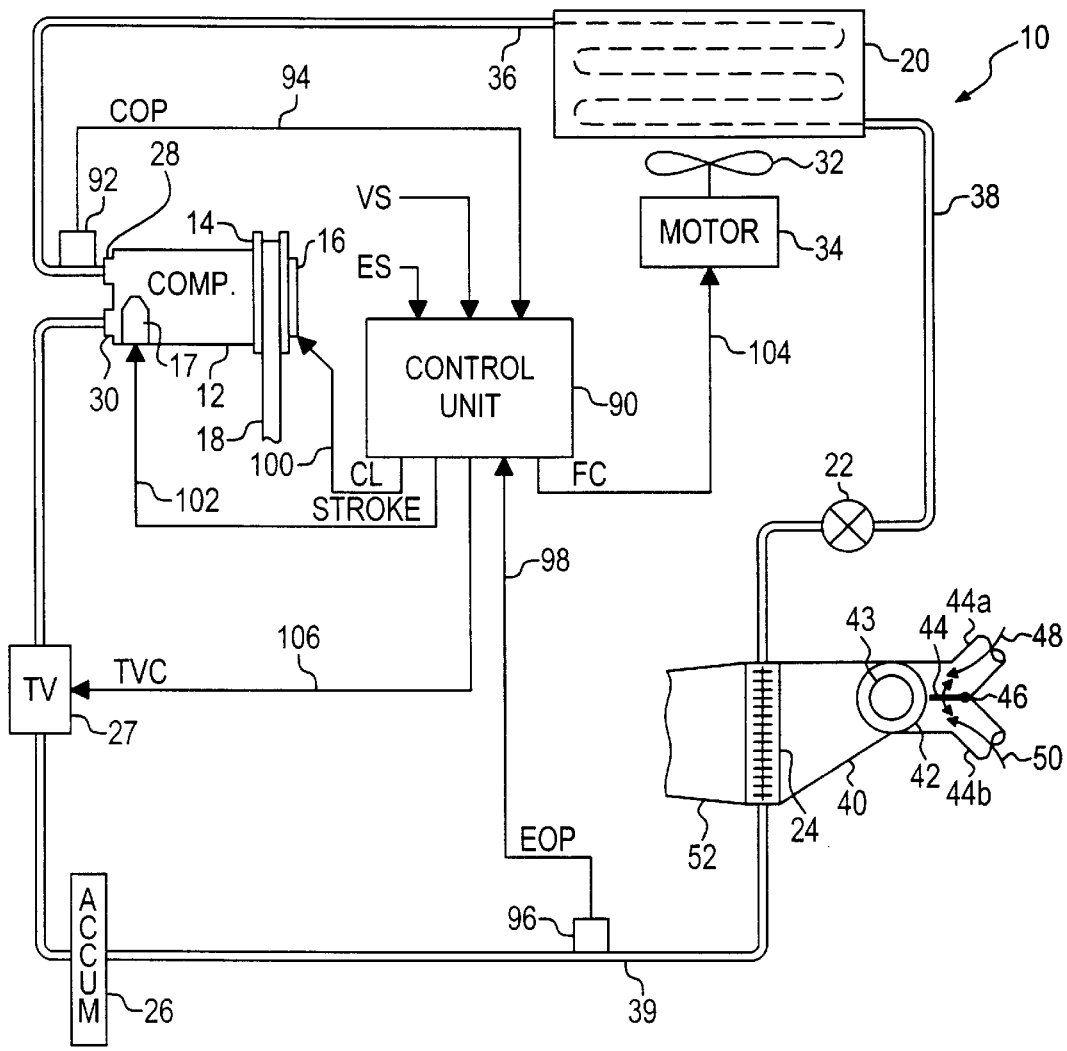
FIG. 1 is a system diagram of an automotive HVAC system according to this invention, including an electrically activated throttling valve and a microprocessor-based control unit.

Referring to FIG. 1, the reference numeral 10 generally designates a vehicle air conditioning system, including a refrigerant compressor 12 coupled to a drive pulley 14 via an electrically activated clutch 16. In the illustrated embodiment, the compressor 12 has a variable stroke for adjusting its capacity, and includes a stroke control valve 17 that is electrically activated to effect capacity control. However, it should be understood that the present invention is not limited to variable stroke compressor systems, and that it also applies to systems incorporating other types of compressors, such as fixed displacement compressors. The pulley 14 is coupled to a rotary shaft of the vehicle engine (not shown) via drive belt 18, and the clutch 16 is selectively engaged or disengaged to turn the compressor 12 on or off, respectively. The system 10 further includes a condenser 20, an orifice tube 22, an evaporator 24, and an accumulator/dehydrator 26 arranged in order between the compressor discharge port 28 and suction port 30. A throttling valve 27 is connected in series with the other system components between the evaporator 24 and the suction port 30, with a preferred location being as close to suction port 30 as possible. A cooling fan 32, operated by an electric drive motor 34 (or alternately, driven by the engine through a belt arrangement), is controlled to provide supplemental air flow through the condenser 20 for removing heat from condenser 20. The orifice tube 22 allows the cooled high pressure refrigerant in line 3 8 to expand in an isenthalpic process before passing through the evaporator 24. The accumulator/dehydrator 26 separates low pressure gaseous and liquid refrigerant, directs a gaseous portion to the compressor suction port 30 via throttling valve 27, and acts as a reservoir for the reserve refrigerant charge. In an alternative system configuration, the orifice tube 22 is replaced with a thermostatic expansion valve (TXV); in this case, the accumulator/dehydrator 26 is omitted, and a receiver/drier (R/D) is inserted in line 38 upstream of the TXV to ensure that sub-cooled liquid refrigerant is supplied to the inlet of the TXV.

The evaporator 24 is formed as an array of finned refrigerant conducting tubes, and an air intake duct 40 disposed on one side of evaporator 24 houses an inlet air blower 42 driven by an electric blower motor 43 to force air past the evaporator tubes. The duct 40 is bifurcated upstream of the blower 42, and an inlet air control door 44 pivoted at point 46 is adjustable as shown to control inlet air mixing; depending on the door position, outside air may enter blower 42 through duct leg 44a as indicated by arrow 48, and passenger compartment air may enter blower 42 through duct leg 44b as indicated by arrow 50. An air outlet duct 52 disposed on the downstream side of blower 42 and evaporator 24 directs the air to one or more passenger compartment outlets.

The system 10 is controlled by the microprocessor-based control unit 90 based on various inputs. In the illustrated embodiment, such inputs include: compressor outlet pressure COP, evaporator outlet pressure EOP, vehicle speed VS and engine speed ES. The compressor outlet pressure COP is detected by a pressure sensor 92 that is coupled to line 36 near the compressor discharge port 28, and that produces an electrical representation of the sensed pressure on line 94. Likewise, the evaporator outlet pressure EOP is detected by a pressure sensor 96 that is coupled to line 39 near the outlet of evaporator 24, and that produces an electrical representation of the sensed pressure on line 98.

In response to the above-mentioned inputs, the control unit 90 develops output signals for controlling the compressor clutch 16, the capacity control valve 17, the cooling blower motor 34, and the throttling valve 27. In FIG. 1, the output signal CL for the clutch 16 appears on line 100, the output signal STROKE for the compressor appears on line 102, the output signal FC for the condenser blower control appears on line 104, and the output signal TVC for the throttling valve 27 appears on line 106.

The system 10 is commonly characterized as comprising a high side portion between the compressor discharge port 28 and the orifice tube 22, and a low side portion between the orifice tube 22 and the compressor suction port 30. The throttling valve 27 is thus disposed in the low side portion downstream of the evaporator 24, and serves to variably restrict the flow of gaseous refrigerant to the suction port 30. In certain prior air conditioning systems, throttling valves have been used to prevent evaporator icing by restricting refrigerant flow based on the low side pressure, such as the evaporator outlet pressure EOP. For example, the refrigerant flow may be restricted as required to keep the evaporator temperature above the freezing point of water. According to the present invention, however, the throttling valve 27 is utilized for an entirely different purpose—preventing high pressure transients in the high side portion of the system. In this case, restricting the low side refrigerant flow under high pressure transient conditions serves to prevent or suppress high side pressure transients by limiting the amount of refrigerant that can enter the compressor suction port 30.

In each of several alternative embodiments, the control unit 90 selectively activates the throttling valve 27 to prevent or suppress the high side pressure transients. In a first embodiment, illustrated by the flow diagram of FIG. 2A, the control unit 90 activates the throttling valve 27 based on the measured compressor outlet pressure COP, relative to predetermined pressure thresholds Pmax and Pmin. In a second embodiment, illustrated by the flow diagram of FIG. 2B, the control unit 90 activates the throttling valve 27 based on the measured compressor outlet pressure COP, and the rates of change of engine speed ES and vehicle speed VS. In a third embodiment, illustrated by the flow diagram of FIG. 2C, the control unit 90 activates the throttling valve 27 based on the compressor outlet pressure COP, the rates of change in vehicle speed VS and engine speed ES, and the evaporator outlet pressure EOP to serve the dual functions of preventing evaporator icing and preventing or suppressing high side pressure transients. Obviously, various other control combinations are also possible. Moreover, the more rudimentary control methods can be carried out with a mechanically controlled valve instead of the control unit 90. Representative valve designs for electrically activated and mechanically activated implementations are depicted in FIGS. 3A–3B and 4A–4B, respectively.

Figure 2A:
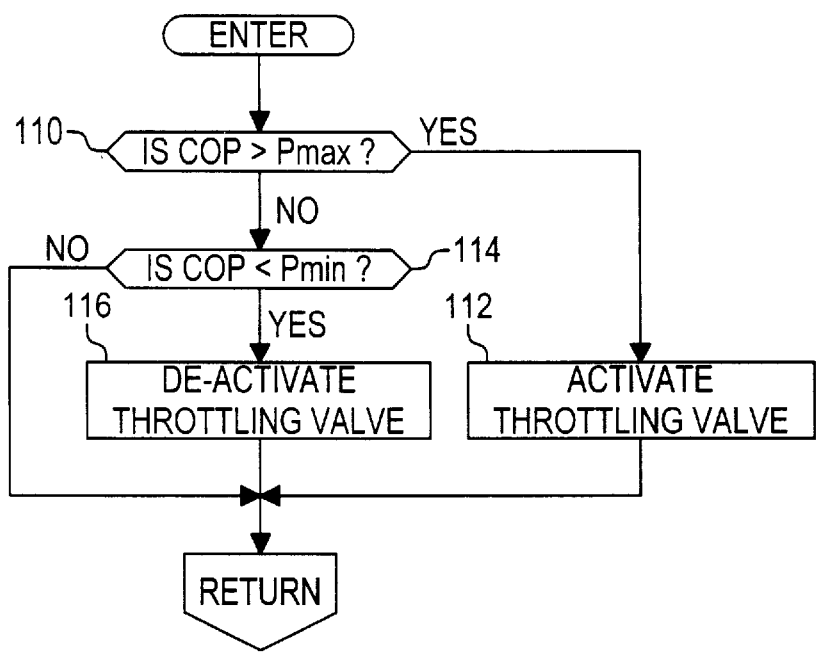
FIGS. 2A–2C are flow diagrams representative of computer program instructions executed by the control unit of FIG. 1 in carrying out a throttling valve control according to this invention.

Referring to FIG. 2A, the first embodiment involves comparing the measured high side pressure COP to the maximum pressure threshold Pmax, as indicated at block 110. If COP exceeds Pmax, block 112 activates the throttling valve 27 to a state of maximum restriction, which is maintained until COP falls below the minimum threshold Pmin, as detected at block 114. Thus, when block 114 is answered in the affirmative, block 116 is executed to deactivate throttling valve 27, which returns throttling valve 27 to the state of minimum restriction.

Figure 2B:
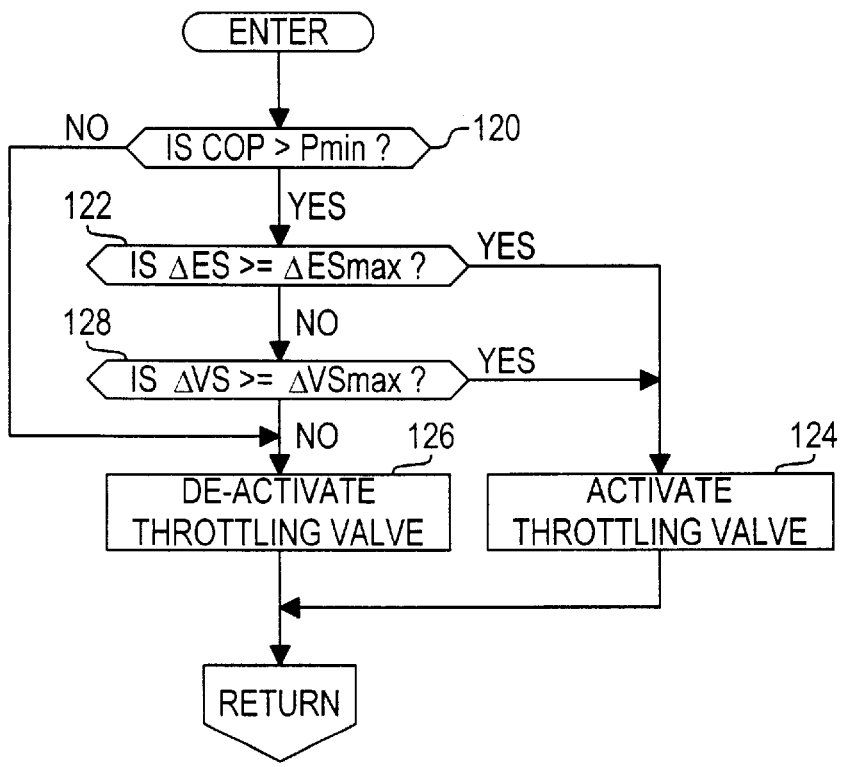

Referring to FIG. 2B, the second embodiment involves monitoring the vehicle and engine speed rates so long as COP exceeds a minimum threshold Pmin (which may be different than the minimum pressure threshold of the first embodiment). The block 120 compares COP to Pmin, and so long as COP exceeds Pmin, the block 122 is executed to compare the rate of change of engine speed ES (that is, the engine acceleration) to a threshold ESmax. If ES is at least as great as ESmax, the block 124 activates the throttling valve 27 to a state of maximum restriction, which is maintained until COP subsequently falls below the minimum threshold Pmin, as indicated by blocks 120 and 126. The throttling valve 27 is activated in the same way if block 128 determines that the rate of change of vehicle speed VS (that is, vehicle acceleration) is at least as great as a threshold VSmax. Thus, throttling valve 27 is (1) activated to a state of maximum restriction if COP exceeds Pmin, and either ES reaches ESmax, or VS reaches VSmax, and (2) subsequently deactivated to a state of minimum restriction when COP falls below Pmin, or ES falls below ESmax and VS falls below VSmax.

Figure 2C:
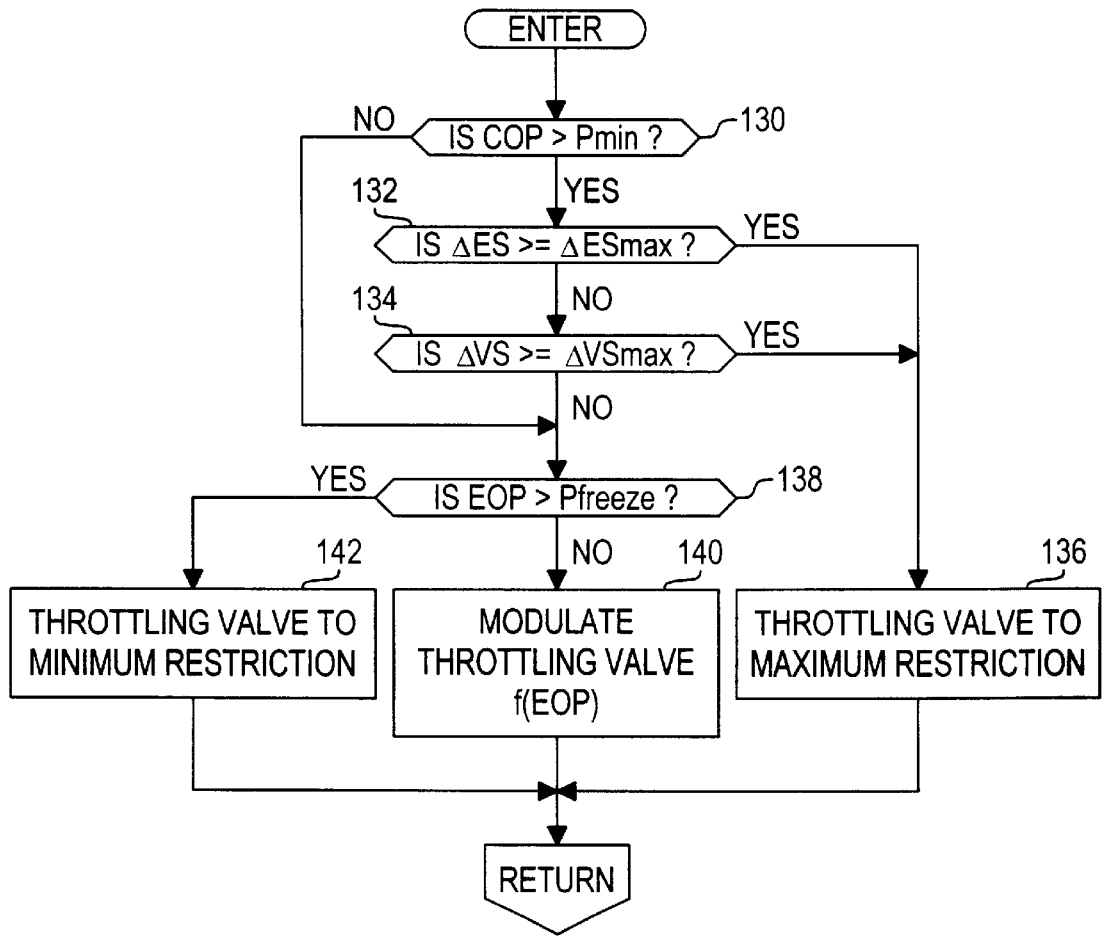

Referring to FIG. 2C, the third embodiment constitutes a dual purpose control in which the throttling valve provides both evaporator icing prevention and high side pressure transient suppression. The high side override conditions are defined by the blocks 130–136, and are essentially the same as described above in respect to the second embodiment. In other words, the throttling valve 27 is activated to a state of maximum restriction if COP exceeds Pmin, and either ES reaches ESmax, or VS reaches VSmax. However, if blocks 130, or 132 and 134 are answered in the negative, the control unit 90 reverts to a base control defined by the blocks 138–142. Block 138 compares the evaporator outlet pressure EOP to a predetermined pressure Pfreeze below which evaporator icing is likely to occur. If EOP is less than or equal to Pfreeze, the throttling valve 27 is controlled (by pulse-width-modulation, for example, or any other actuation method to vary the valve restriction) as a function of EOP to variably restrict refrigerant flow to prevent evaporator icing, as indicated at block 140. If EOP is greater than Pfreeze, evaporator icing is unlikely, and the block 142 is executed to de-activate the throttling valve 27 to a state of minimum restriction.

Figure 3A:
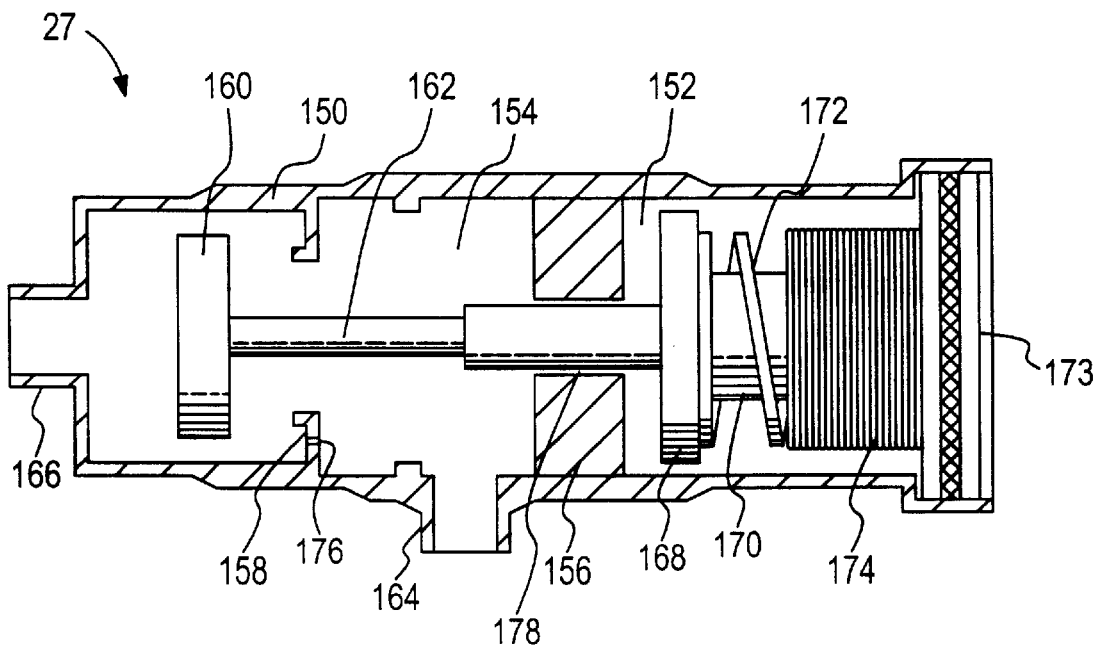
FIGS. 3A and 3B depict alternate mechanizations of the electrically activated throttling valve of FIG. 1.
Figure 3B:
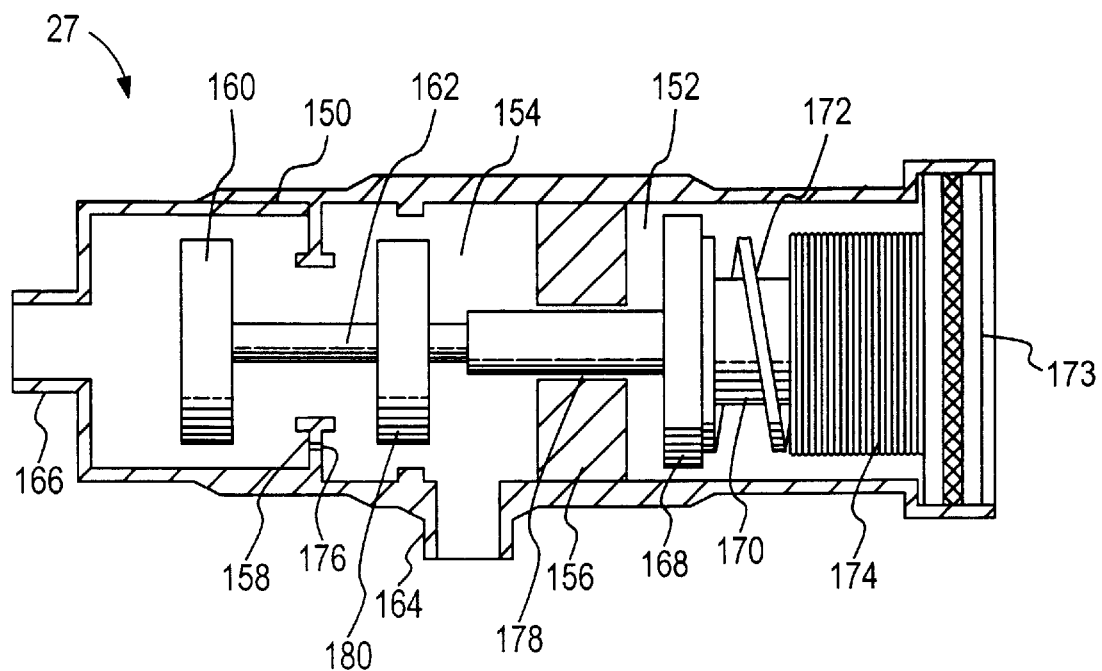

FIGS. 3A–3B depict alternate mechanizations of the throttling valve 27 of FIG. 1. The valve depicted in FIG. 3A is used in connection with the single function control methodologies of FIGS. 2A and 2B, whereas the valve depicted in FIG. 3B is used in connection with the dual function control methodology of FIG. 2C.

Referring to FIG. 3A, the valve 27 comprises a cylindrical valve body 150 divided into inboard and outboard compartments 152, 154 by an interior bushing 156. A valve seat 158 is formed in the outboard compartment 154, and a valve member 160 is mounted on valve stem 162 for axial movement within a portion of the compartment 154 downstream of the seat 158. An inlet port 164 disposed in compartment 154 upstream of the valve seat 158 receives refrigerant from the accumulator 26, and an outlet port 166 disposed in compartment 154 downstream of the valve member 160 supplies refrigerant to the compressor suction port 30. The valve stem 162 passes through an opening in bushing 156, terminating in a land 168 and ferromagnetic slug 170. A spring 172 disposed in the inboard compartment 152 engages the land 168, biasing the stem 162 and valve member 160 leftward (as shown in FIG. 3A), and a solenoid coil 174 disposed about slug 170 operates when activated with electric current to draw slug 170 rightward against the bias of spring 172. Finally, the seat 158 and bushing 156 are provided with bleed passages 176 and 178 for pressure equalization. In operation, the valve 27 operates in one of two states depending on whether solenoid coil 174 is activated with electric current. When solenoid coil 174 is not activated, the spring 172 biases valve member 160 substantially to the position depicted in FIG. 3A to establish a state of minimum restriction between inlet port 164 and outlet port 166. However, when the solenoid coil 174 is activated, the consequent magnetic field draws slug 170 rightward against the spring bias to bring valve member 160 into engagement or near-engagement with the valve seat 158, establishing a state of maximum restriction between inlet port 164 and outlet port 166.

The throttling valve 27 of FIG. 3B is similar to that of FIG. 3A, except that an additional valve member 180 is mounted on stem 162 upstream of the valve seat 158 for purposes of preventing evaporator icing. A similar maximum restriction state is achieved when solenoid coil 174 is fully activated in opposition to the bias of spring 172 to draw valve member 160 into engagement with the valve seat 158 for high side pressure suppression; in such state, the additional valve member 180 serves no purpose. However, when high side pressure suppression is not in effect, the solenoid coil 174 can be variably activated as a function of the evaporator outlet pressure EOP, in this case to assist the bias of spring 172, to variably position the control member 180 relative to the valve stop 158 to prevent evaporator icing. When EOP is sufficiently high that evaporator icing is not likely (i.e., EOP>Pfreeze), the solenoid coil 174 is variably activated to position valve member 160 and 180 to a state of minimum restriction.

Figure 4A:
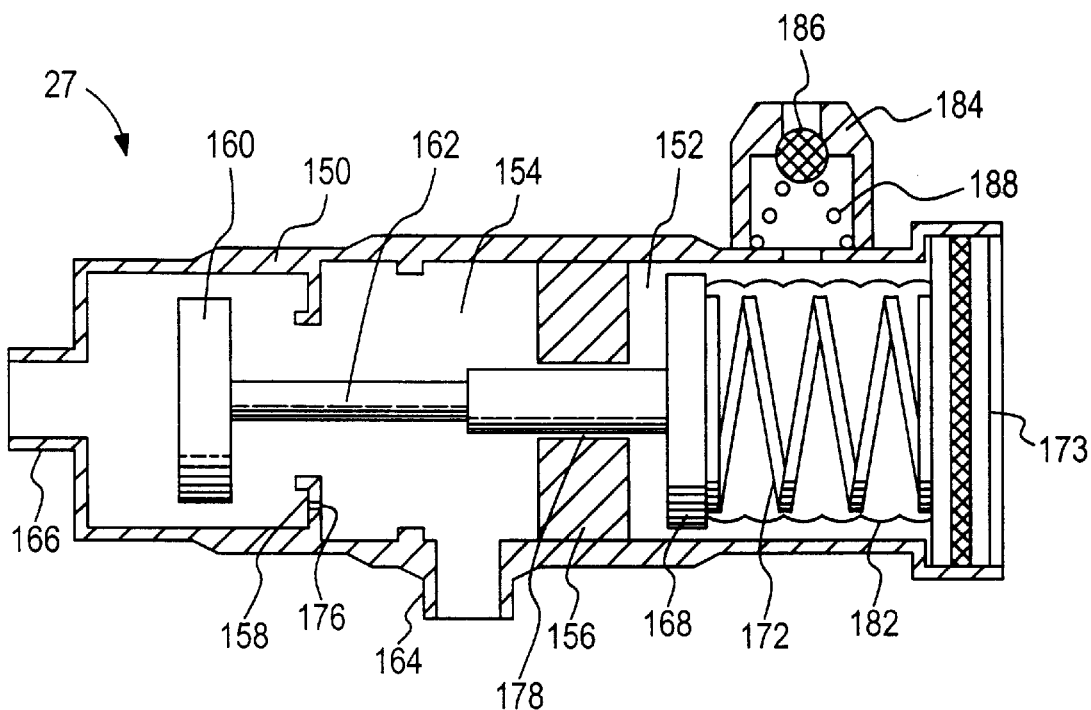
FIGS. 4A and 4B depict mechanically activated throttling valves corresponding in function to the electrically activated throttling valves of FIGS. 3A and 3B, respectively.
Figure 4B:
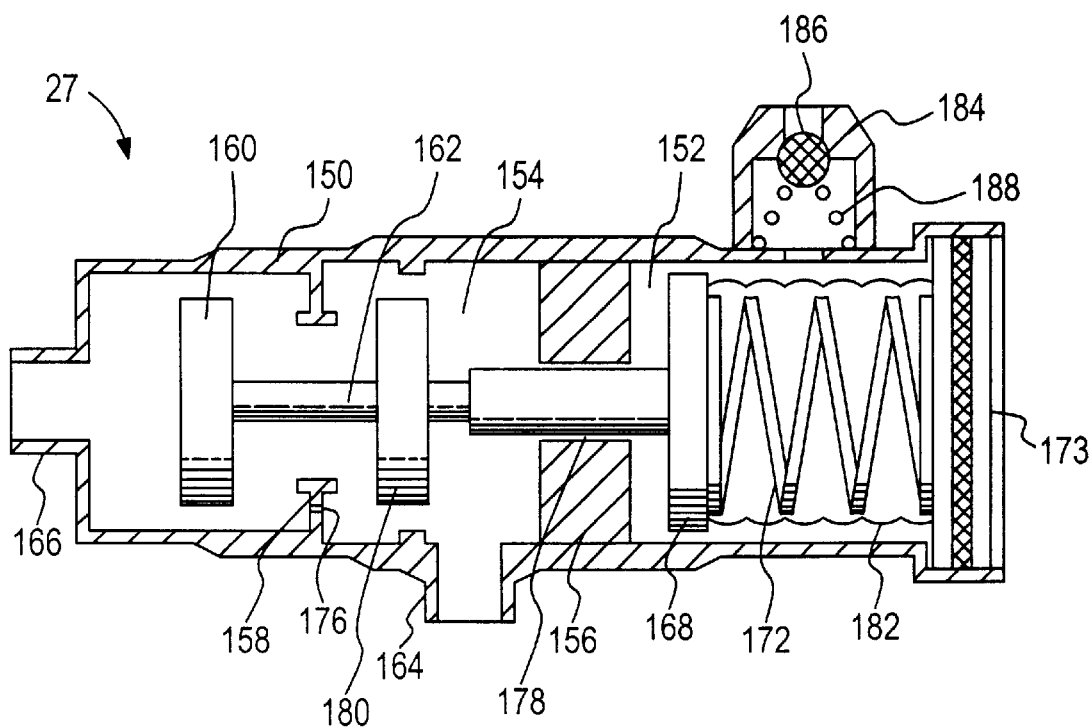

FIGS. 4A–4B depict further possible variations in the design of throttling valve 27 for implementations in which the throttling valve 27 is activated mechanically instead of electrically. Functionally, the valve designs of FIGS. 4A and 4B correspond to the above-described valve designs of FIGS. 3A and 3B, respectively. In general, the valves of FIGS. 4A–4B differ from those of FIGS. 3A–3B in several respects: (1) the solenoid coil 174 is omitted, (2) a rubber boot or evacuated metallic bellows 182 is fitted over spring 172, and (3) a high pressure port 184 is provided in the inboard portion 152 of valve body 150 for connection to the high pressure refrigerant in line 36. A check ball 186 and bias spring 188 in the high pressure port 184 isolate the inboard portion 152 from the high side refrigerant so long as the high side refrigerant does not exceed the sum of the spring force and the pressure present in the inboard portion 152.

The single-purpose valve 27 of FIG. 4A remains in a minimum restriction state when the check ball 186 is seated as shown, similar to the minimum restriction state of the valve of FIG. 3A. When the high side pressure is sufficiently high to unseat check ball 186, the high pressure refrigerant entering inboard portion 152 through port 184 creates a large force that opposes and overcomes the bias force of spring 172. In this case, valve member 160 is moved into engagement with valve seat 158 to establish a state of maximum restriction, similar to the maximum restriction state of the valve of FIG. 3A.

The dual-purpose valve 27 of FIG. 4B likewise shifts to a state of maximum restriction (with valve member 160 engaging valve seat 158) when the high side pressure is sufficiently high to unseat check ball 186, similar to the operation of the valve of FIG. 4A and the valve of FIG. 3B when the solenoid coil 174 is activated in opposition to the bias of spring 172. However, when the high side pressure is insufficient to unseat check ball 186, the low side refrigerant pressure entering inboard portion 152 through bleed passage 178 acts on land 168, creating a variable force that works in combination with the force of bias spring 172. This force balance positions the valve member 180 relative to the valve seat 158 as a function of the low side pressure in much the same way as achieved by the controlled activation of solenoid coil 174 in the valve of FIG. 3B.

In summary, this invention enables reliable and cost-effective prevention or suppression of high side pressure spikes in a motor vehicle air conditioning system through the use of a throttling valve in the low side of the refrigerant system. A most cost-effective implementation is achieved when the valve operates to prevent evaporator icing in addition to preventing or suppressing acceleration induced high side pressure spikes. While the invention has been described in reference to a variety of different embodiments, it is nevertheless expected that various modifications beyond those mentioned above will occur to those skilled in the art. For example, in the embodiment of FIG. 2A, pressure transducer 92 and control unit 90 may be replaced with a simple high pressure electrical switch that electrically activates the throttling valve 27 when the pressure in line 36 exceeds a preset threshold. Additionally, various combinations of the disclosed control methodologies and valve designs could be used to accomplish the same or similar control functions. Accordingly, it will be understood that systems and methods incorporating these and other modifications may fall within the scope of this invention, which is defined by the appended claims.

What is claimed is:

1. A method of operation for a motor vehicle air conditioning system including a refrigerant compressor driven by a vehicle engine, the compressor having a discharge port for supplying high pressure refrigerant to a high pressure portion of the system, and a suction port for receiving low pressure refrigerant from a low pressure portion of the system, the method of operation comprising the steps of:

detecting a high side pressure based on a pressure of the refrigerant supplied to the high pressure portion of the system by the discharge port of said compressor; and restricting a flow of the low pressure refrigerant received by the suction port of the compressor in dependence on the detected high side pressure so as to maximize the restriction of refrigerant flow when the detected high side pressure rises above a maximum threshold, and minimize the restriction of refrigerant flow when the detected high side pressure subsequently falls below a minimum threshold which is lower than said maximum threshold.

2. A method of operation for a motor vehicle air conditioning system including a refrigerant compressor driven by a vehicle engine, the compressor having a discharge port for supplying high pressure refrigerant to a high pressure portion of the system, and a suction port for receiving low pressure refrigerant from a low pressure portion of the system, the method of operation comprising the steps of:

detecting a high side pressure based on a pressure of the refrigerant supplied to the high pressure portion of the system by the discharge port of said compressor;

detecting a rate of change in speed of the vehicle or the vehicle engine; and restricting a flow of the low pressure refrigerant received by the suction port of the compressor in dependence on the detected high side pressure and the detected rate of change in speed so as to maximize the restriction of refrigerant flow when the detected high side pressure is above a pressure threshold and the detected rate of change in speed exceeds a rate of change threshold.

3. A method of operation for a motor vehicle air conditioning system including a refrigerant compressor driven by a vehicle engine, the compressor having a discharge port for supplying high pressure refrigerant to a high pressure portion of the system, and a suction port for receiving low pressure refrigerant from a low pressure portion of the system, wherein the low pressure portion of the system includes an evaporator, the method of operation comprising the steps of:

detecting a high side pressure based on a pressure of the refrigerant supplied to the high pressure portion of the system by the discharge port of said compressor;

detecting a low side pressure based on a pressure of the refrigerant at an outlet of the evaporator;

so long as the detected high side pressure is below a threshold, restricting a flow of the low pressure refrigerant between the evaporator and the suction port of the compressor as required to prevent evaporator icing based on the detected low side pressure; and increasing the restriction of refrigerant flow to a maximum when the detected high side pressure exceeds the threshold.

4. The method of operation of claim 3, including the steps of:

detecting a rate of change in speed of at least one of the vehicle and engine; and increasing the restriction of refrigerant flow to a maximum when the detected high side pressure exceeds the threshold and the detected rate of change in speed exceeds a rate of change threshold.

5. A motor vehicle air conditioning system including a refrigerant compressor driven by a vehicle engine, the compressor having a discharge port for supplying high pressure refrigerant to a high pressure portion of the system, and a suction port for receiving low pressure refrigerant from a low pressure portion of the system, the system comprising:

a throttling valve disposed in the low pressure portion of said system and operable to variably restrict a flow of the low pressure refrigerant received by the suction port of the compressor, said throttling valve having a normal state of minimum restriction;

means for detecting a high side pressure based on a pressure of the refrigerant supplied to the high pressure portion of the system by the discharge port of said compressor; and control means for operating said throttling valve in dependence on the detected high side pressure so as to activate said throttling valve to a state of maximum restriction so long as the detected high side pressure exceeds a pressure threshold.

6. The system of claim 5, wherein the detected high side pressure is supplied to a control chamber of said throttling valve to activate said throttling valve to said state of maximum restriction when the detected high side pressure exceeds the pressure threshold.

7. The system of claim 6, wherein the low pressure portion of the system includes an evaporator, and the throttling valve is disposed in the low pressure portion of said system between an outlet of the evaporator and the suction port of the compressor, the throttling valve including a passage connecting refrigerant from said low pressure portion to said control chamber so that the refrigerant flow through said throttling valve is variably restricted in dependence on a pressure of such refrigerant to prevent icing in said evaporator so long as the detected high side pressure does not exceed the pressure threshold.

8. The system of claim 5, wherein the throttling valve includes a solenoid coil that is electrically activated to the state of maximum restriction by said control means when the detected high side pressure exceeds a pressure threshold.

9. The system of claim 8, wherein the low pressure portion of the system includes an evaporator, and the throttling valve is disposed in the low pressure portion of said system between an outlet of the evaporator and the suction port of the compressor, and said solenoid coil is variably activated by said control means in dependence on a refrigerant pressure at the outlet of the evaporator to prevent icing in said evaporator so long as the detected high side pressure does not exceed the pressure threshold.

10. A motor vehicle air conditioning system including a refrigerant compressor driven by a vehicle engine, the compressor having a discharge port for supplying high pressure refrigerant to a high pressure portion of the system, and a suction port for receiving low pressure refrigerant from a low pressure portion of the system, and an evaporator disposed in the low pressure portion of the system, comprising:

a throttling valve disposed in the low pressure portion of said system between the evaporator and the suction port of the compressor, and operable to variably restrict a flow of the low pressure refrigerant received by the suction port of the compressor in dependence on a pressure of such refrigerant as required to prevent icing in said evaporator;

means for detecting a high side pressure based on a pressure of the refrigerant supplied to the high pressure portion of the system by the discharge port of said compressor; and control means for controlling said throttling valve to a state of maximum restriction when the detected high side pressure exceeds a pressure threshold so as to limit the pressure of the refrigerant supplied to the high pressure portion of the system by the discharge port of the compressor.

11. The system of claim 10, wherein the detected high side pressure is supplied to a control chamber of said throttling valve when the detected high side pressure exceeds the pressure threshold.

12. The system of claim 10, wherein the throttling valve includes a solenoid coil that is electrically activated by said control means to produce the said state of maximum restriction when the detected high side pressure exceeds the pressure threshold.

13. The system of claim 12, wherein the control means receives a signal corresponding to a speed of the engine or vehicle, and activates the solenoid coil to produce the state of maximum restriction when the detected high side pressure exceeds the pressure threshold and a rate of change of the received signal exceeds threshold rate of change.

14. The system of claim 10, wherein the throttling valve includes a solenoid coil that is electrically activated by said control means in dependence on a pressure at the outlet of said evaporator to produce the variable restriction required to prevent icing in said evaporator.

15. The system of claim 14, wherein the control means variably activates the solenoid coil to produce a state of minimum restriction when the pressure at the outlet of the evaporator is above a pressure threshold indicative of potential evaporator icing.

* * * * *